Aug. 12, 1958 H. R. KAISER 2,847,659

COUPLING CIRCUIT FOR MAGNETIC BINARIES

Filed Feb. 16, 1956

HAROLD R. KAISER,
INVENTOR

BY [signature]

ATTORNEY

United States Patent Office 2,847,659

Patented Aug. 12, 1958

2,847,659

COUPLING CIRCUIT FOR MAGNETIC BINARIES

Harold R. Kaiser, Los Angeles, Calif., assignor to Hughes Aircraft Company, Culver City, Calif., a corporation of Delaware Application February 16, 1956, Serial No. 566,042

7 Claims. (Cl. 340—174)

Figure 1:
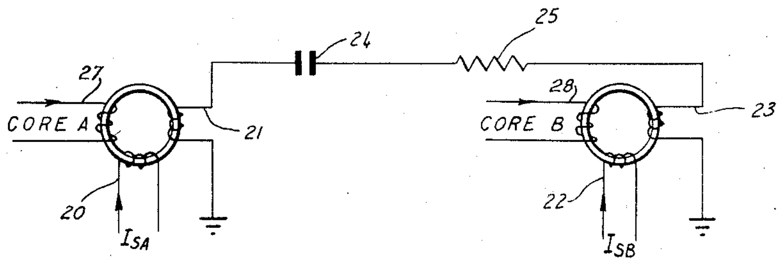

The present invention relates to a coupling circuit for magnetic binaries, and more particularly to a coupling circuit which can be easily controlled to shift information signals in either direction between associated binary stages.

Magnetic binaries have found increasingly wide usage in memory devices as well as in shift registers, flip-flops, gating circuits, and other digital computation circuits. In memory devices the basic requirement is that it be possible to read out from each magnetic binary stage a signal indicating the value of the binary digit previously stored therein. In logical and computation circuits, on the other hand, a great deal more versatility is desirable. For example, it is quite advantageous to be able to transfer an information signal between two magnetic binary stages by means of a coupling circuit which is bi-directional, but whose direction of operation can be easily controlled.

At the present time, it is the prevailing practice to provide coupling between magnetic binary stages that includes one or more unidirectional elements such as diodes, for the purpose of directionalizing the flow of information. It is desirable to eliminate any diode required in the associated coupling circuit because diodes have a high initial cost and are not reliable in operation. It is therefore evident that it is desirable to have a coupling circuit which uses no diodes.

It is, therefore, an object of the present invention to provide a coupling circuit for magnetic binaries, which uses no diodes.

Another object of the invention is to provide a magnetic binary memory device incorporating a bi-directional coupling circuit.

A further object of the invention is to provide a coupling circuit wherein the signal windings associated with each separate magnetic binary have substantially equal numbers of turns.

According to the present invention a coupling circuit is provided which includes signal windings coupled to each adjacent magnetic binary and an electrostatic storage device such as a capacitor is connected in series circuit relationship between the signal windings in a manner to form a closed loop circuit. Sufficient resistance is included in the circuit to preclude substantial oscillations. The transfer of a signal state from one magnetic binary stage to the other takes place in three phases. In the first phase the reversal of state of the first stage causes the storage device, in this instance the series capacitor to be charged up; in the second phase, the capacitor discharges resulting in a reversal of current in the closed loop circuit to effect a change in the state of the second binary stage; and finally, the capacitor continues its discharges back to its initial condition.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

Figure 2:
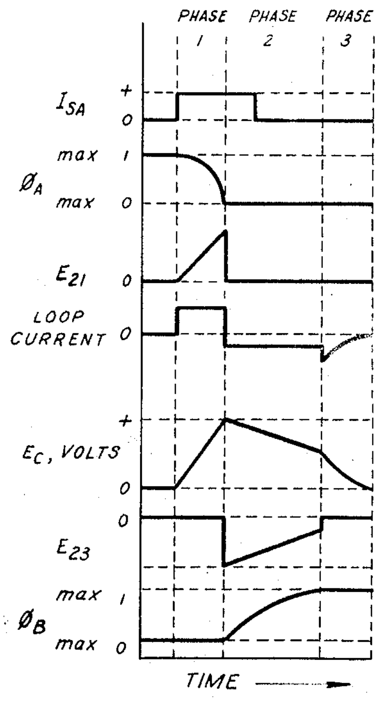

Fig. 1 illustrates in schematic form a pair of magnetic binary stages together with a coupling circuit as provided by the present invention; and Fig. 2 illustrates the time relationships between the voltage, current, and flux values in the circuit of Fig. 1.

Reference is now made to Fig. 1 illustrating an embodiment of the bidirectional coupling circuit provided by the present invention which comprises a core A with a shift winding 20 and a signal winding 21 and a core B with a shift winding 22 and a signal winding 23. The upper terminals of windings 21 and 23 are connected together through a series circuit including the electrostatic storage device or a capacitor 24 and a resistor 25 and the lower terminals referenced to a fixed potential such as, for example, ground.

Assuming that a "shift" current pulse is applied to winding 20 of such a polarity as to cause core A to reverse its state of residual magnetization, the mode of operation of the circuit is as follows. During the reversal of state of core A the voltage generated by signal winding 21 causes current to flow through the series circuit including winding 23, cpacitor 24, and resistor 25. If the current tends to establish in core B the same magnetization state which already exists therein, then the impedance of signal winding 23 is substantially zero and little or no voltage will appear across winding 23. Capacitor 24 becomes charged up as a result of the flow of current around the series loop. After the reversal of state of core A, the voltage formerly generated by winding 21 collapses and the current flowing in the series circuit reverses its direction. Winding 21 now presents substantially zero impedance while winding 23 presents a relatively high impedance inasmuch as the direction of the current flow has reversed. During the ensuing discharge of capacitor 24 the magnetizing force of winding 23 reverses the residual state of core B. The impedance of winding 23 is then again reduced to substantially zero, hence capacitor 24 is effectively in series only with resistor 25. The remaining charge on capacitor 24 is therefore dissipated by the flow of current through resistor 25.

In terms of the more familiar numerical notation using binary 1 and 0, the typical operation of the circuit of Fig. 1 is as follows. Initially core B is set to 0 while core A is set to 1. In order to provide an initial condition where core A is set to 1 a current pulse of opposite polarity to that of the "shift" pulse may be applied either to winding 20 or to a separate input signal winding 27. A similar input signal winding 28 is provided for core B. It is desired to read out the binary 1 signal stored in core A, setting core A to 0 while simultaneously transferring the 1 into B. Application of the shift pulse to winding 20 reverses the remanent state of core A while simultaneously generating a voltage across winding 21. The polarities of windings 21 and 23 with respect to each other, and to cores A and B, is such that the signal generated in winding 21 causes a current to flow in such a direction that, since core B was previously set to 0, the current encounters subtsantially zero impedance from winding 23. Thus core B is reversed from the 0-state to the 1-state as described above. In this connection it will be noted that the polarities of windings 21 and 23 of Fig. 1 with respect to each other are opposite from the relative polarities of signal windings in conventional usage.

If core B initially stores an 0 and core A an 0, then the application of a "shift" or readout pulse to winding 20 does not generate any voltage across winding 21 and the above described sequence of events does not occur. Both cores remain in the 0-state. Hence, in a logical or mathematical sense, it can be said that when a shift pulse of the proper polarity, magnitude, and time duration is applied to winding 20 of core A, the signal stored in A will be transferred into core B, whether that signal has a value 1 or 0. In order for this result to occur, however, core B must previously have been set to the 0 state.

According to the preferred embodiment of the present invention signal windings 21 and 23 have substantially equal numbers of turns, thus permitting the transfer of information either from A to B or from B to A with equal facility. Resistor 25 illustrated as a physical resistor is included only to prevent oscillations, hence an equivalent amount of resistance may be supplied in some other manner if desired.

In the preferred embodiment of the invention the resistance value is sufficient to provide at least critical damping of the circuit.

Reference is now made to Fig. 2 illustrating the voltage, current, and flux relationships existing during the shifting of a binary 1 from core A to core B in the circuit of Fig. 1. Symbol $I_{sa}$ represents the shift current pulse applied to winding 20. Symbol $E_c$ represents the voltage charge appearing across capacitor 24. $E_{21}$ and $E_{23}$ represent the voltages appearing across windings 21 and 23, respectively. Symbols $\phi_A$ and $\phi_B$ represent the flux in cores A and B respectively, the notations $MAX_1$ and $MAX_0$ indicating saturation in the binary 1 and 0 directions, respectively.

It will be noetd that the information shifting process involves three successive steps in time, denoted as phase 1, phase 2, and phase 3, respectively, all in accordance with the above description of operation. Shift current pulse $I_{sa}$ must have a time duration sufficient to reverse the remanent state of flux in core A, and must also have sufficient energy content to simultaneously charge capacitor 24. It will be noted that phase 2, when capacitor 24 is discharging for reversing the state of core B, has a substantially longer time duration than phase 1. The reason for this is that during phase 2 winding 23 presents a very substantial amount of impedance, hence capacitor 24 has a discharge time constant substantially greater than its time constant for charging during phase 1. It is therefore possible by means of proper selection of circuit values to insure that the volt-time integral per turn applied to winding 23 during phase 2 for reversing the state of core B gives rise to a flux change in core B which is at least as great as that occurring in core A during phase 1 when the state of core A is reversed.

This is true despite the fact that the signal windings have substantially equal numbers of turns.

The wave shapes shown in Fig. 2 are idealized, however, the circuit operation is not critical in this respect.

The structural differences between the circuit provided by the present invention and various coupling circuits of the prior art will now be pointed out. The primary and most significant difference appears to be the elimination of diodes from the circuit. The second important difference is that the present invention uses a storage device such as a capacitor in series with the signal windings of both associated binary stages, a feature novel in itself. A third structural difference is that the polarities of the signal windings 21 and 23 relative to each other is opposite to what is used in conventional types of circuits.

Very considerable advantages are provided by the novel operation of the circuit of the present invention. Thus it is possible to use substantially equal numbers of turns in the signal windings of the various binary stages in a logical system, to shift information from one stage to another without loss of signal strength, and at the same time to be able to shift the information back from whence it came or on to some other and different binary stage will without any loss in the signal strength. Furthermore, the above advantages are achieved without the use of diodes or other unidirectional circuit elements.

A particularly useful application of the present invention is to provide a flip-flop or bistable device. For example, core B may be initially set to 0 by applying a current pulse to winding 22; core A may initially be selectively set to either 1 or 0 by applying a current pulse of appropriate polarity to winding 20; and thereafter the binary digit initially stored in core A may be cyclically transferred back and forth between core A and core B by applying shift current pulses alternately to windings 20 and 22. Whether the binary digit being transferred back and forth is a binary 1 or a binary 0 can be ascertained by connecting an output lead, not shown, either to signal winding 21 or to signal winding 23. For example, if the output lead is attached to winding 21 the application of a shift current pulse to winding 20 will cause a voltage representing the stored binary digit to appear on the output lead during phase 1 of the information transfer; and the application of a shift current pulse to winding 22 will cause a voltage representing the stored binary digit to appear on the output lead during phase 2 of the information transfer. The value of the stored binary digit may be changed at any time by applying control pulses to appropriate windings.

What is claimed is:

1. In combination, a pair of magnetic cores, each of said cores having at least a signal winding coupled thereto, and a closed bi-directional transfer loop intercoupling the said signal windings of said magnetic cores, said closed loop including at least an electrostatic storage device connected in series circuit relationship with said windings, said storage device having a storage capacity sufficient for storing the energy generated in one of said windings during a change of state of the corresponding magnetic core and being effective to transfer said stored energy through the said one winding to the other winding of said loop upon the change of magnetic state of said corresponding magnetic core for changing the state of the other magnetic core.

2. The combination as defined in claim 1 wherein said electrostatic storage device comprises a reactive impedance device proportioned to store the energy derived from said signal winding, and a resistive impedance device connected in series circuit relationship with said reactive impedance device, said resistive impedance device being proportioned to prevent oscillation in said transfer loop.

3. In combination, a first magnetic core having at least a shift winding and a signal winding coupled thereto, a second magnetic core having at least a shift winding and a signal winding coupled thereto, and a closed transfer loop intercoupling the said signal windings of said first and second magnetic cores, said closed loop including at least an electrostatic storage device connected in series circuit relationship with said windings, said storage device having a storage capacity sufficient for storing the energy resulting upon the energization of one of the shift windings for changing the state of the corresponding one of said first and second magnetic cores, said storage device being further arranged to release said stored energy through the corresponding signal winding for the said energized shift winding to the other signal winding upon the change of state of said corresponding one magnetic core in response to the energization of said one shift winding.

4. A bistable element comprising first and second magnetic cores; each of said magnetic cores having a substantially rectangular hysteresis loop, and each having a signal winding and a shift winding coupled to said cores; a bi-directional transfer loop intercoupling said signal windings of said first and second magnetic cores; said transfer loop including a capacitive reactance device connected in said loop in series circuit relationship with said windings; said capacitive device being proportioned to receive and retain electrical energy during the interval said first or second magnetic core is caused to traverse a portion of said hysteresis loop in response to the energization of the corresponding shift winding for the said core and to discharge the energy through the said corresponding signal winding and through said signal winding for the other magnetic core to cause the latter core to change state.

5. A magnetic core device including; first and second magnetic cores, each of said cores having a substantially rectangular hysteresis loop and having a signal winding coupled to each of said cores, and a transfer loop interconnecting each of said signal windings, said loop including a capacitor connected in series circuit relationship with said windings.

6. A magnetic core device as defined in claim 5 wherein said windings have substantially the same number of turns and are magnetically oriented with respect to their individual cores to produce magnetic fluxes therein of opposite polarities.

7. In combination, a pair of magnetic cores, each of said cores having at least a signal winding and a shift winding coupled thereto, said signal windings having a substantially equal number of turns and oriented with respect to their individual cores to produce a flux therein of opposite polarities, and a capacitive and a resistive impedance device connected in series circuit relationship with each of said signal windings, said capacitive impedance device being proportioned to receive and store the energy generated in one of said signal windings upon the energization of the corresponding shift winding therefor and to release the energy to the other signal winding upon the change of state of said magnetic core for said corresponding shift winding.

References Cited in the file of this patent

UNITED STATES PATENTS

| | | |
|---|---|---|
| 2,652,501 | Wilson | Sept. 15, 1953 |
| 2,653,254 | Spitzer | Sept. 22, 1953 |
| 2,695,396 | Anderson | Nov. 23, 1954 |
| 2,709,757 | Triest | May 31, 1955 |
| 2,730,695 | Ziffer | Jan. 10, 1956 |
| 2,741,758 | Cray | Apr. 10, 1956 |
| 2,758,221 | Williams | Aug. 7, 1956 |
| 2,781,503 | Saunders | Feb. 12, 1957 |
| 2,785,390 | Rajchman | Mar. 12, 1957 |

OTHER REFERENCES

"Magnetic and Ferro-electric Computing Components" (Newhouse), Electronic Engineering, May 1954, pp. 192–199.

"Magnetic Shift Register Using One Core Per Bit" (Kodis et al.), 1953 IRE National Convention Record.

Notice of Adverse Decision in Interference

In Interference No. 90,103 involving Patent No. 2,847,659, H. R. Kaiser, Coupling circuit for magnetic binaries, final decision adverse to the patentee was rendered Sept. 17, 1963, as to claims 1, 2, 3, 4 and 5.

[*Official Gazette November 12, 1963.*]